United States Patent
Devonald

(10) Patent No.: US 7,530,685 B2
(45) Date of Patent: May 12, 2009

(54) TRISAZO DYES FOR INKS FOR INK JET PRINTING

(75) Inventor: David Phillip Devonald, Blackley (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 410 days.

(21) Appl. No.: 10/534,339

(22) PCT Filed: Nov. 13, 2003

(86) PCT No.: PCT/GB03/04928

§ 371 (c)(1),
(2), (4) Date: May 10, 2005

(87) PCT Pub. No.: WO2004/046252

PCT Pub. Date: Jun. 3, 2004

(65) Prior Publication Data

US 2006/0054054 A1    Mar. 16, 2006

(30) Foreign Application Priority Data

Nov. 15, 2002    (GB) .................................. 0226708.6

(51) Int. Cl.
*C00D 11/00* (2006.01)
(52) U.S. Cl. .................. 347/100; 106/31.48; 106/31.77
(58) Field of Classification Search ................ 347/100; 106/31.13, 31.27, 31.48, 31.77; 534/54
See application file for complete search history.

(56) References Cited

U.S. PATENT DOCUMENTS

| | | | | |
|---|---|---|---|---|
| 2,370,500 | A | * | 2/1945 | Sparks ........................ 534/685 |
| 3,033,846 | A | * | 5/1962 | Demagistri et al. ......... 534/708 |
| 4,395,288 | A | * | 7/1983 | Eida et al. ................ 106/31.51 |
| 4,426,226 | A | | 1/1984 | Ohta et al. |
| 2001/0012027 | A1 | * | 8/2001 | Murcia et al. .................. 347/22 |

FOREIGN PATENT DOCUMENTS

| | | | |
|---|---|---|---|
| CH | 741578 A | * | 12/1953 |
| DE | 87 973 | | 7/1896 |
| DE | 268 488 | | 11/1910 |
| DE | 894 423 | | 10/1953 |
| EP | 0 051785 | | 5/1982 |
| EP | 1 260 556 | | 11/2002 |
| GB | 741 578 | | 12/1955 |
| GB | 1 569 259 | | 6/1980 |
| WO | 01/62854 | | 8/2001 |

* cited by examiner

*Primary Examiner*—Manish S Shah
*Assistant Examiner*—Laura E Martin
(74) *Attorney, Agent, or Firm*—Morgan Lewis Bockius LLP

(57) ABSTRACT

A process for printing an image on a substrate including applying thereto a composition comprising a liquid medium and a tris-azo compound of Formula (1) or salt thereof:

Formula (1)

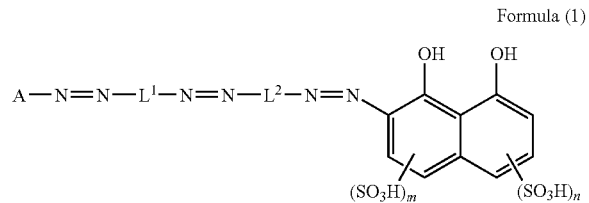

wherein:

A is an optionally substituted alkenyl, homocyclic or heterocyclic group;

$L^1$ and $L^2$ are each independently optionally substituted aryl or heteroaryl; and m and n are each independently 0 or 1 such that m+n is 1 or 2;

wherein:
(i) the compound of Formula (1) is optionally in the form of a metal chelate; and
(ii) at least one of $L^1$ and $L^2$ carries at least one substituent selected from sulpho, carboxy, $C_{1-4}$-alkoxy and $C_{1-4}$-alkoxy-OH. Also claimed are compositions and compounds comprising Formula (1).

18 Claims, No Drawings

TRISAZO DYES FOR INKS FOR INK JET PRINTING

This invention relates to compounds, to processes for their preparation, to compositions derived therefrom and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of ink jet nozzles because this will stop the printer from working. The inks should also be stable to storage over time without decomposing or forming a precipitate which could block the fine nozzles.

JP 58-174459 describes certain dis-azo dyes comprising once-coupled 1,8-dihydroxynaphthalene and their use in ink jet printing.

JP 57-36693 and U.S. Pat. No. 4,395,288 describe certain tetra-azo dyes comprising 1,8-dihydroxynaphthalene and their use in ink jet printing.

U.S. Pat. No. 1,209,154, published in 1916, describes the synthesis of certain tris-azo dyes comprising a 1,8-dihydroxynaphthalene group at one end and a 1,3-diaminobenzene group at the other end. These dyes are used for the conventional dyeing of cotton.

GB 809279, published in 1959, describes the synthesis of copper complexes of certain tris-azo dyes comprising once-coupled 1,8-dihydroxynaphthalene and a 3,3'-dimethoxy-1,1'-diphenyl linker. These dyes are used for the conventional dyeing of cotton.

Surprisingly it has been found that the tris-azo dyes of the present invention have exceptional properties when used as ink jet inks, producing prints of high optical density (OD) of a neutral black with excellent light and ozone-fastness and high operability.

According to the present invention there is provided a process for printing an image on a substrate comprising applying thereto a composition comprising a liquid medium and a tris-azo compound of Formula (1) or salt thereof:

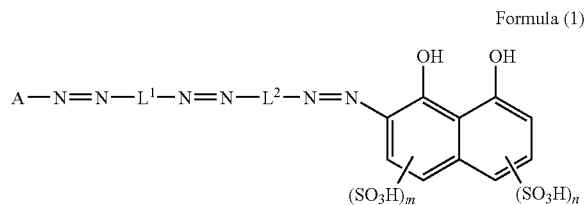

Formula (1)

wherein:
A is an optionally substituted alkenyl, a homocyclic or heterocyclic group;
$L^1$ and $L^2$ are each independently optionally substituted aryl or heteroaryl; and
m and n are each independently 0 or 1 such that m+n is 1 or 2;

wherein:
(i) the compound of Formula (1) is optionally in the form of a metal chelate; and
(ii) at least one of $L^1$ and $L^2$ carries at least one substituent selected from sulpho, carboxy, $C_{1-4}$-alkoxy and $C_{1-4}$-alkoxy-OH.

Preferably the composition is applied to the substrate by means of an ink jet printer. The ink jet printer preferably applies the composition to the substrate in the form of droplets which are ejected through a small orifice onto the substrate. Preferred ink jet printers are piezoelectric ink jet printers and thermal ink jet printers. In thermal ink jet printers, programmed pulses of heat are applied to the composition in a reservoir by means of a resistor adjacent to the orifice, thereby causing the composition to be ejected in the form of small droplets directed towards the substrate during relative movement between the substrate and the orifice. In piezoelectric ink jet printers the oscillation of a small crystal causes ejection of the composition from the orifice.

The image is preferably text, a picture, a photorealistic image or a combination thereof.

The substrate is preferably paper, plastic, metal or glass, more preferably a treated substrate such as a coated paper or coated plastic, especially plain paper. One of the advantages of the present process is its ability to provide very good printing results even on plain paper.

Preferred papers have an acid, alkaline or neutral character. Examples of commercially available treated papers include HP Premium Coated Paper™, HP Photopaper™, HP Printing paper™ (available from Hewlett Packard Inc.); Stylus Pro 720 dpi Coated Paper™, Epson Photo Quality Glossy Film™, Epson Photo Quality Glossy Paper™(all available from Seiko Epson Corp.); Canon HR 101 High Resolution Paper™, Canon GP 201 Glossy Paper™, Canon HG 101and HG201 High Gloss Film™, Canon PR101™ (all available from Canon); Kodak Premium Photopaper, Kodak Premium InkJetpaper™ (available from Kodak); Konica Inkjet Paper QP™ Professional Photo Glossy, Konica Inkjet Paper QP™ Professional Photo 2-sided Glossy, Konica Inkjet Paper QP™ Premium Photo Glossy, Konica Inkjet Paper QP™ Premium Photo Silky™ (available from Konica) and Xerox Acid Paper (available from Xerox).

In this specification any groups shown in the free acid form also include the salt form. Furthermore the formulae shown in this specification cover all tautomers thereof.

When the compound of Formula (1) is in the form of a salt preferred salts are alkali metal salts, especially lithium, sodium and potassium salts, ammonium and substituted ammonium salts and mixtures thereof. Especially preferred salts are salts with ammonia and volatile amines. The free acid form may be converted into a salt using known techniques. For example, an alkali metal salt may be converted into a salt with ammonia or an amine by dissolving an alkali metal salt of the composition in water, acidifying with a mineral acid and adjusting the pH of the solution to pH 9 to 9.5 with ammonia or the amine and removing the alkali metal cations by dialysis.

The preferred optionally substituted homocyclic or heterocyclic group groups represented by A are optionally substituted aryl, heteroaryl and non-aromatic cyclic groups.

Preferred optionally substituted aryl groups represented by A, $L^1$ and $L^2$ are each independently optionally substituted phenyl, biphenyl or naphthyl. In another embodiment of the present invention it is preferred that A is optionally substituted heteroaryl. Preferred optionally substituted heteroaryl groups represented by A, $L^1$ and $L^2$ are any heterocycle or substituted heterocycle comprising a 5- to 7-membered ring. Similarly preferred non-aromatic heterocyclic groups represented by A comprise a 5- to 7-membered ring, preferably comprising at least one double bond.

Examples of heteroaryl groups include pyridyl, furyl, thienyl, thiazolyl, isothiazolyl, imidazolyl, benzimidazolyl, pyrazinyl, pyrimidyl, quinolyl, isoquinolyl, benzofuryl, benzothienyl, pyrazolyl, indolyl, purinyl, isoxazolyl, oxazolyl, thiadiazolyl and furazanyl groups.

Examples of non-aromatic cyclic groups include pyridonyl, pyrazolonyl, piperidinyl, piperazinyl, pyrrolidinyl, morpholinyl, tetrahydrofuranyl, tetrahydrothiophenyl and tetrahydropyranyl, with pyridonyl being especially preferred.

Preferred optionally substituted alkenyl groups are of the Formula (2) and tautomers thereof:

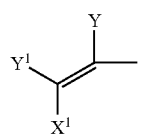

Formula (2)

wherein:
Y is an electron withdrawing group;
$Y^1$ is H, alkyl, aryl, OR or $N(R)_2$ in which each R independently is H, optionally substituted alkyl or optionally substituted aryl; and
$X^1$ comprises at least one heteroatom selected from N, O and S.

Y is preferably selected from CN, $CO_2H$, $CO_2R$, CON$(R)_2$, COR and —$SO_2N(R)_2$ in which each R independently is as defined above. When R is optionally substituted alkyl it is preferably $C_{1-8}$-alkyl, more preferably $C_{1-4}$-alkyl. When R is optionally substituted aryl it is preferably phenyl or naphthyl, more preferably phenyl. When R is optionally substituted alkyl or aryl optional substituents are preferably selected from water solubilising groups, particularly $SO_3H$, $SO_2NH_2$, $CO_2H$ or $PO_3H_2$ and salts thereof.

When $Y^1$ is alkyl it is preferably $C_{1-8}$alkyl, more preferably $C_{1-4}$-alkyl. When $Y^1$ is aryl it is preferably phenyl.

$X^1$ is preferably OR, $CO_2R$ or NR in which R is as defined above.

More preferably Y is $CO_2R^1$, $Y^1$ is $OR^1$ and $X^1$ is $OR^1$ wherein each $R^1$ independently is H or $C_{1-4}$-alkyl.

Optional substituents which may be present on A, $L^1$ and $L^2$ are preferably selected from OH, $SO_3H$, CN, carbonamido, $PO_3H_2$, $CO_2H$, $NO_2$, $NH_2$, optionally substituted alkyl (especially $C_{1-4}$-alkyl optionally carrying a sulpho, carboxy, phosphato, $C_{1-4}$-alkoxy, amino or hydroxy group), optionally substituted alkoxy (especially $C_{1-4}$-alkoxy optionally carrying a sulpho, carboxy, phosphato, $C_{1-4}$-alkoxy, $C_{1-4}$-alkyl, amino or hydroxy group), optionally substituted aryl (especially phenyl or phenyl carrying from 1 to 3 substituents selected from sulpho, carboxy, phosphato, $C_{1-4}$-alkoxy, amino, hydroxy and N carrying one or two $C_{1-4}$-alkyl groups optionally carrying a sulpho, carboxy, phosphato, $C_{1-4}$-alkoxy, amino or hydroxy group), optionally substituted amine (especially N carrying one or two $C_{1-4}$-alkyl groups optionally carrying a sulpho, carboxy, phosphato, $C_{1-4}$-alkoxy, amino or hydroxy group) and optionally substituted acylamine (especially $C_{1-4}$-acylamino).

Preferably A carries from 0 to 5 substituents, more preferably 1 to 4 substituents, especially 1, 2 or 3 substituents. In a preferred embodiment A is not 1,3-diaminophenyl.

As examples of optionally substituted phenyl and naphthyl groups represented by A there may be mentioned 2,4-dihydroxyphenyl, 3-sulfo-4,6-diaminophenyl, 2-hydroxy-4-diethylaminophenyl 2-sulfo-4-diethylaminophenyl, 1-hydroxy-3,6-disulphonaphthyl and 1,8-dihydroxy-3,6-disulfonaphthyl. Preferred optionally substituted heteroaryl groups represented by A are any heterocycle or substituted heterocycle comprising a 5- to 7-membered ring, more preferably optionally substituted pyridyl, pyrazolyl or 1,2,4-triazolyl.

Preferably $L^1$ and $L^2$ are each independently, or comprise, one or more arylene groups, more preferably one or two optionally substituted phenylene or naphthylene groups. When $L^1$ or $L^2$ is, or comprises, more than one arylene group, the said arylene groups are optionally connected by means of a covalent bond or group containing from 1 to 10 atoms selected from O, S, N, C, H and combinations thereof, for example —O—, —$NR^2$—, —$NR^2$—CO—, —$NR^2CONR^2$—, —S—, —SO—, —$SO_2$—, —$SO_2NR^2$— or —C $R^2$═C $R^2$—, wherein each $R^2$ independently is H or $C_{1-4}$-alkyl.

Preferably $L^1$ and $L^2$ are each independently optionally substituted phenylene or naphthylene, wherein at least one of $L^1$ and $L^2$ carries at least one substituent selected from sulpho, carboxy, $C_{1-4}$-alkoxy and $C_{1-4}$-alkoxy-OH. Preferably $L^1$ and $L^2$ each independently carries from 0 to 3 substituents, more preferably 1 or 2 substituents, such that at least one of $L^1$ and $L^2$ carries at least one substituent selected from sulpho and carboxy. Further preferably at least one of $L^1$ and $L^2$ carries at least one substituent selected from $C_{1-4}$-alkoxy and $C_{1-4}$-alkoxy-OH.

Preferably $L^1$ carries a substituent selected from sulpho and carboxy.

Preferably $L^2$ carries at least one substituent selected from sulpho, carboxy $C_{1-4}$-alkoxy and $C_{1-4}$-alkoxy-OH.

As examples of optionally substituted phenylene and naphthylene groups represented by $L^1$ and $L^2$ there may be mentioned 2-sulphophenylene, 2-carboxyphenylene, 2,5-dihydroxyethyloxyphenylene, 2,5-dimethoxyphenylene, 2,5-disulphophenylene, 2,5-diethoxyphenylene, 2-methyl-5-methoxyphenylene and 7-sulphonaphthylene.

When the compound of Formula (1) is in the form of a metal chelate the metal is preferably Boron or a transition metal, more preferably Mn, Fe, Cr, Co, Ni, Cu or Zn, especially Co, Ni or Cu. The metal may be complexed with the compound of Formula (1) in a ratio of from 1:2 to 2:1, preferably in a ratio of metal to compound of Formula (1) of 1:2, 2:3, 1:1, 2:2 or 2:1, especially 2:1. However we have found that when the compound of Formula (1) is not in the form of a metal chelate the compound is still a valuable colorant for ink jet printing. Such unmetallised dyes are cheaper and easier to make than the corresponding metal chelates and they are more environmentally friendly due to the absence of, for example, transition metals.

Preferably the compound of Formula (1) is black.

Bearing in mind the above preferences, the compound of Formula (1) is preferably of the Formula (1) wherein:

A is optionally substituted pyridyl, furyl, thienyl, thiazolyl, isothiazolyl, imidazolyl, benzimidazolyl, pyrazinyl, pyrimidyl, quinolyl, isoquinolyl, benzofuryl, benzothienyl, pyrazolyl, indolyl, purinyl, isoxazolyl, oxazolyl, thiadiazolyl, furazanyl, pyridonyl, pyrazolonyl, piperidinyl, piperazinyl, pyrrolidinyl, morpholinyl, tetrahydrofuranyl, tetrahydrothiophenyl or tetrahydropyranyl;

$L^1$ phenyl or naphthyl optionally carrying a substituent selected from sulpho and carboxy;

$L^2$ is phenyl or naphthyl carrying at least one substituent selected from sulpho, carboxy, $C_{1-4}$-alkoxy and $C_{1-4}$-alkoxy-OH; and m and n are each independently 0 or 1 such that m+n is 1 or 2;

wherein said optional substituents are selected from OH; $SO_3H$; CN; carbonamido; $PO_3H_2$; $CO_2H$; $NO_2$; $NH_2$; $C_{1-4}$-alkyl optionally carrying a sulpho, carboxy, phosphato, $C_{1-4}$-alkoxy, amino or hydroxy group; $C_{1-4}$-alkoxy optionally carrying a sulpho, carboxy, phosphato, $C_{1-4}$-alkoxy, $C_{1-4}$-alkyl, amino or hydroxy group; phenyl or phenyl carrying from 1 to 3 substituents selected from sulpho, carboxy, phosphato, $C_{1-4}$-alkoxy, amino, hydroxy and N carrying one or two $C_{1-4}$-alkyl groups optionally carrying a sulpho, carboxy, phosphato, $C_{1-4}$-alkoxy, amino or hydroxy group; N carrying one or two $C_{1-4}$-alkyl groups optionally carrying a sulpho, carboxy, phosphato, $C_{1-4}$-alkoxy, amino or hydroxy group; and $C_{1-4}$-acylamino.

Further preferably, bearing in mind the above preferences, the compound of Formula (1) is of the Formula (1) wherein:
A is pyridonyl carrying at least one substituent selected from carbonamido and $C_{1-4}$ alkyl;
$L^1$ is phenyl carrying at least one sulpho substituent;
$L^2$ is phenyl carrying at least one substituent selected from sulpho, carboxy $C_{1-4}$-alkoxy and $C_{1-4}$-alkoxy-OH; and
m and n are both 1.

According to a second aspect of the present invention there is provided a tris-azo compound of Formula (1) or salt thereof as hereinbefore defined, with the provisos that:
(i) the compound of Formula (1) is optionally in the form of a metal chelate;
(ii) $L^1$ and $L^2$ are each independently optionally substituted phenylene or naphthylene;
(iii) optional substituents present on $L^1$ and $L^2$ are selected from OH, $SO_3H$, CN, carbonamido, $PO_3H_2$, $CO_2H$, $NO_2$, $NH_2$, optionally substituted alkyl, optionally substituted alkoxy, optionally substituted aryl, optionally substituted amine and optionally substituted acylamine;
(iv) at least one of $L^1$ and $L^2$ carries at least one substituent selected from sulpho, carboxy, $C_{1-4}$-alkoxy and $C_{1-4}$-alkoxy-OH; and
(v) when $L^1$ carries a methoxy group A is not 1,3-diaminophenyl.

The preferences for the compound according to the second aspect of the present invention are as described above in relation to the first aspect of the present invention, with the proviso that when both groups represented by L are free from sulpho, carboxy and $C_{1-4}$-alkoxy-OH groups then A is not 1,3-diaminophenyl.

According to a third aspect of the present invention there is provided a composition comprising a tris-azo compound of Formula (1) or salt thereof as defined in relation to the first aspect of the present invention and a low melting point solid or a liquid medium comprising water and an organic solvent, wherein the compound of Formula (1) is not Formula (3) or a salt thereof:

Preferably the group represented by A in the compound of Formula (1) is not 1,3-diaminophenyl.

The composition preferably comprises:
(a) from 0.01 to 30 parts of a compound of Formula (1) or salt thereof as defined in relation to the first aspect of the present invention; and
(b) from 70 to 99.99 parts of a low melting point solid or a liquid medium comprising water and an organic solvent;

wherein all parts are by weight and the number of parts of (a)+(b)=100.

The process preferably uses the aforementioned composition.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably component (a) is completely dissolved in component (b). Preferably component (a) has a solubility in component (b) at 20° C. of at least 10%. This allows the preparation of liquid dye concentrates which may be used to prepare inks and reduces the chance of the dye precipitating if evaporation of the liquid medium occurs during storage.

The weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of

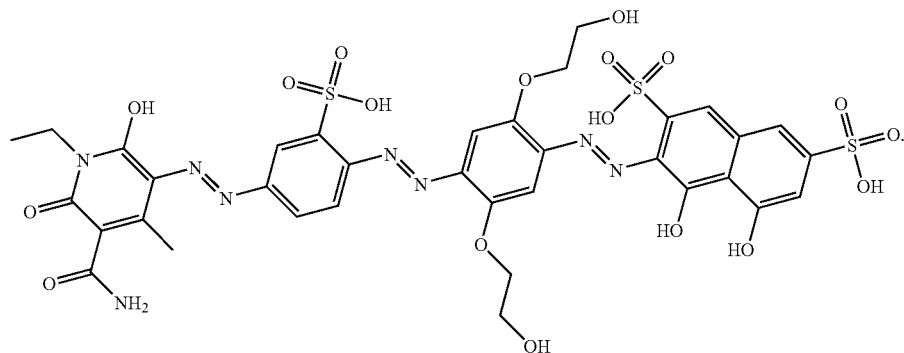

Formula (3)

diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially ((2-methoxy-2)-ethoxy)-2-ethoxyethanol.

Optionally the liquid medium comprises an oxidant.

Preferred low melting point solids have a melting point in the range from 60° C. to 125° C. Suitable low melting point solids include long chain fatty acids or alcohols, preferably those with $C_{18-24}$ chains, and sulphonamides. The compound of Formula (1) may be dissolved in the low melting point solid or may-be finely dispersed in it.

Typically the liquid medium will further comprise one or more surfactants, for example anionic and/or nonionic surfactants. Examples of anionic surfactants include: Sulfonate surfactants such as Sulfosuccinates (Aerosol™ OT, A196; AY and GP, available from CYTEC) and Sulfonates (Aerosol™ DPOS-45, OS available from CYTEC; Witconate™ C-50H available from WITCO; Dowfax™ 8390 available from DOW); and Fluoro surfactants (Fluorad™ FC99C available from 3M). Examples of nonionic surfactants include: Fluoro surfactants (Fluorad™ FC170C available from 3M); Alkoxylate surfactants (Tergitol™ series 15S-5, 15S-7, and 15S-9 available from Union Carbide); and Organosilicone surfactants (Silwet™ L-77 and L-76-9 available from WITCO).

One or more buffers may optionally be included in the liquid medium to modulate pH of the ink. The buffers can be organic-based biological buffers or inorganic buffers, preferably, organic-based. Examples of preferably-employed buffers include tris(hydroxymethyl)aminomethane (TRIS), available from companies such as Aldrich Chemical (Milwaukee, Wis.), 4-morpholine ethanesulfonic acid (MES), 4-morpholinepropanesulfonic acid (MOPS), and beta-hydroxy-4-morpholinepropanesulfonic acid (MOPSO). Further, the buffers employed should provide a pH ranging from about 3 to about 9 in the practice of the invention, preferably about 4 to about 6 and most preferably from about 4 to about 5.

One or more of the biocides commonly employed in inkjet inks may optionally be used in the ink, such as Nuosept™ 95, available from Huls America (Piscataway, N.J.); Proxel™ GXL, available from Zeneca (Wilmington, Del.); and glutaraldehyde, available from Union Carbide Company (Bound Brook, N.J.) under the trade designation Ucarcide 250.

Inks according to the invention may optionally also include one or more metal chelator. Such chelators are used to bind transition metal cations that may be present in the ink. Examples of preferred metal chelators include: ethylenediaminetetraacetic acid ("EDTA"), diethylenediaminepentaacetic acid ("DPTA"), trans-1,2-diaminocyclohexanetetraacetic acid ("CDTA"), ethylenedinitrilotetraacetic acid ("EGTA"), or other chelators.

In one embodiment inks according to the invention have a pH of from about 3 to about 5, preferably from about 3.5 to about 4.5. In another embodiment the pH of the composition is preferably from 4 to 11, more preferably from 7 to 10. Optionally the composition comprises a buffer.

The viscosity of the composition at 25° C. is preferably less than 50 cP, more preferably less than 20 cP and especially less than 5 cP.

When the compositions according to the invention are used as ink jet printing compositions, the composition preferably has a concentration of less than 500 parts per million, more preferably less than 100 parts per million of halide ions. It is especially preferred that the composition has less than 100, more preferably less than 50 parts per million of divalent and trivalent metals, wherein parts refer to parts by weight relative to the total weight of the composition. We have found that purifying the compositions to reduce the concentration of these undesirable ions reduces nozzle blockage in ink jet printing heads, particularly in thermal ink jet printers. Similarly low levels as divalent and trivalent metals are also preferred.

The compounds of the invention may be used as the sole colorant in the compositions because of their attractive black shade. However, if desired, one may combine the present compounds together and/or with one or more further colorants to reduce nozzle blockage (by improving their solubility) or if a slightly different shade is required for a particular end use. The further colorants are preferably dyes. When further colorants are included in the composition these are preferably selected from black, magenta, cyan and yellow colorants and combinations thereof.

Suitable further black colorants include C.I.Food Black 2, C.I.Direct Black 19, C.I.Reactive Black 31, PRO-JET™ Fast Black 2, C.I.Direct Black 195; C.I.Direct Black 168; and black dyes described in patents by Lexmark (e.g. EP 0 539, 178 A2, Example 1, 2, 3, 4 and 5), Orient Chemicals (e.g. EP 0 347 803 A2, pages 5-6, azo dyes 3, 4, 5, 6, 7, 8, 12, 13, 14, 15 and 16) and Seiko Epson Corporation.

Suitable further magenta colorants include PRO-JET™ Fast Magenta 2.

Suitable further yellow colorants include C.I.Direct Yellow 142; C.I.Direct Yellow 132; C.I.Direct Yellow 86; PRO-JET™ Yellow OAM; PRO-JET™ Fast Yellow 2; C.I.Direct Yellow 85; C.I. Direct Yellow 173; and C.I.Acid Yellow 23.

Suitable further cyan colorants include phthalocyanine colorants, C.I. Direct Blue 199 and C.I. Acid Blue 99.

The composition may also contain additional components conventionally used in ink jet printing inks, for example viscosity and surface tension modifiers, corrosion inhibitors, biocides, kogation reducing additives and surfactants which may be ionic or non-ionic.

In a fourth aspect of the invention we have also devised a process for the preparation of a compound of Formula (1) as hereinbefore defined which comprises diazotising an amine of Formula (4) and coupling the resultant diazonium salt with a compound of Formula A-H:

Formula (4)

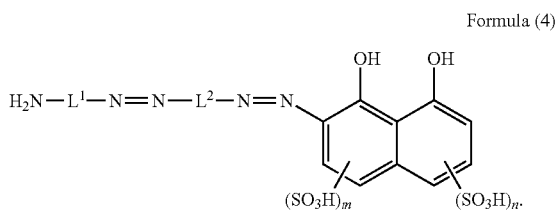

The compound of Formula (4) may be prepared by diazotising a compound of Formula $CH_3CONH-L^1-N{=}N-L^2-NH_2$ and coupling the resultant diazonium salt onto a suitable 1,8-dihydroxy naphthalene compound, then removing the $CH_3CO$ group by hydrolysis. The compound of Formula $CH_3CONH-L^1-N{=}N-L^2-NH_2$ may be prepared by diazotising an amine of formula $CH_3CONH-L^1-NH_2$ and coupling onto an amine of Formula $H-L^2-NH_2$.

Preferably the diazotisations are carried out using a diazotising agent, especially sodium nitrite under acidic conditions. Further preferably the diazotisations are carried out at a temperature of 0 to 5° C. In the above process A, $L^1$, $L^2$, m and n are as hereinbefore defined.

A further aspect of the present invention provides a paper, an overhead projector slide or a textile material printed with a composition, a compound or by means of a process according to the present invention.

A still further as aspect of the present invention provides an ink jet printer cartridge, optionally refillable, comprising one or more chambers and a composition, wherein the composition is present in at least one of the chambers and the composition is as defined in the third aspect of the present invention.

The present compounds and compositions provide prints of attractive, neutral black shades that are particularly well suited for the ink jet printing of text and images. The compositions have good storage stability and low tendency to block the very fine nozzles used in ink jet printers. Furthermore, the resultant images have good optical density, light-fastness, wet-fastness and resistance to fading in the presence of oxidising air pollutants (e.g. ozone).

The invention is further illustrated by the following Examples in which all parts and percentages are by weight unless specified otherwise. The abbreviation "Ac" means $CH_3CO-$.

EXAMPLE 1

Preparation of

Preparation of Intermediate
2,5-di-(2-acetoxyethoxy)aniline

Step 1—Preparation of
1,4-bis-(2-acetoxyethoxy)hydroquinone

Hydroquinonebis-(2-hydroxyethyl)ether (179 g), acetic acid (100 ml) and acetic anhydride (300 ml) were stirred and heated under reflux overnight. After cooling to room temperature and drowning into water (2 l) the product was isolated by filtration, washed with water, dried and recrystallised from ethanol to give 212 g of product.

Step 2—Preparation of
2-Nitro-1,4-bis-(2-acetoxyethoxy)hydroquinone

The product of step 1 (211.5 g) was dissolved in acetic acid (1800 ml). A mixture of nitric acid (51.9 ml) and acetic acid (200 ml) was then added over 20 minutes keeping the temperature below 20° C. After stirring at room temperature overnight the solution was drowned into water (9 l) and the product isolated by filtration, washed with water and recrystallised from ethanol to give 209 g of product.

Step 3—Preparation of
2,5-di-(2-acetoxyethoxy)aniline

2-Nitro-1,4-bis-(2-acetoxyethoxy)hydroquinone (115 g) was dissolved in ethanol at 50° C. and reduced with hydrogen in the presence of palladium catalyst (2 g, 5% Pd/C). When uptake of hydrogen ceased the solution was screened to remove the catalyst and the filtrates allowed to cool to room temperature. The crystalline solid was isolated by filtration and dried under vacuum to give 90 g of product.

Stage one—Preparation of monoazo-4-(4-Acetylamino-2-sulpho-3-phenylazo)-2,5-di-(2-acetoxyethoxy)aniline

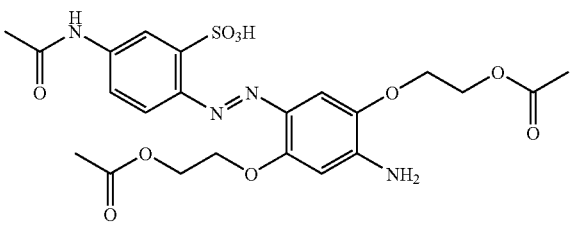

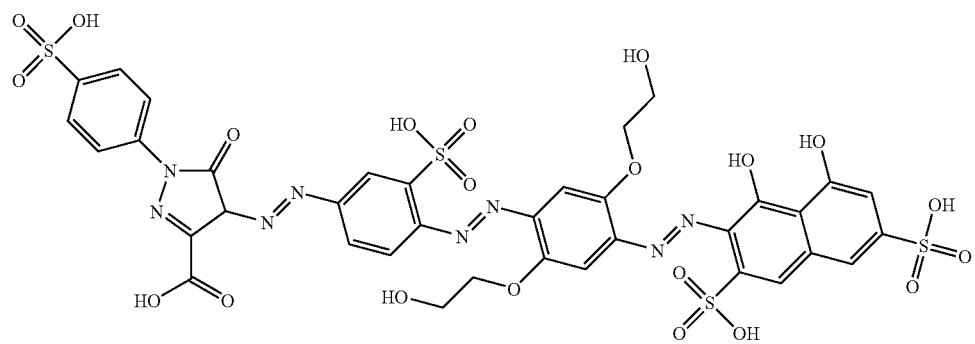

4-Amino-3-sulphoacetanilide (174 g; 0.6 mol) was stirred in water (2.5 l) at pH 9 and sodium nitrite (45.54 g; 0.66 mol) added. The solution was added to ice/water containing concentrated hydrochloric acid (180 ml) with stirring. After stirring for 1.5 h at less than 10° C. the excess nitrous acid was destroyed by the addition of sulphamic acid. 2,5-di-(2-acetoxyethoxy)aniline (178.2 g; 0.6 mol) was dissolved in acetone (1000 ml) and added to the above diazonium salt suspension at 0-10° C. followed by the slow addition of pyridine (30 ml). After stirring overnight at room temperature the precipitated product was filtered-off, washed with water. The damp paste was then stirred in acetone, filtered and dried (50° C.) to give a an orange solid (210 g; 64%).

Stage Two—Preparation of Bisazo Intermediate

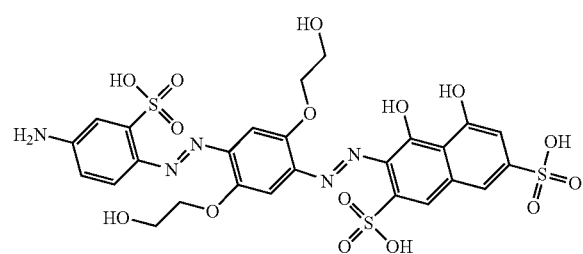

The monoazo product from Stage one (24.75 g; 0.05 mol) was dissolved in water (300 ml) with stirring at pH 10 to which sodium nitrite (6.90 g; 0.1 mol) and acetone (200 ml) were added. The resulting mixture was then added to 0.10M hydrochloric acid (70 ml) with stirring at room temperature. After stirring for 1 h, the excess nitrous acid was destroyed by the addition of sulphamic acid. The resulting diazonium salt was then added to a stirred solution of chromotropic acid (20.00 g; 0.05 mol) at 0-10° C. at pH 7-8 maintained by the addition of 2N lithium hydroxide when necessary. After stirring overnight the product was precipitated by the addition of 25% (w/v) lithium chloride then filtered and washed with 30% (w/v) lithium chloride solution. The resulting damp paste was suspended in water (700 ml) and lithium hydroxide hydrate (25.00 g; 0.60 mol) added and the solution heated at 70° C. After 3 h the solution neutralised to pH 6-7 by the addition of concentrated hydrochloric acid. The product was precipitated by the slow addition of 20% (w/v) lithium chloride, filtered and washed with 25% (w/v) lithium chloride solution. The damp paste was dissolved in water and then dialysed to low conductivity. The solution was evaporated to dryness (70° C.) to give a black powder (25.5 g; 67%)

Stage Three—Preparation of Title Dye

The amino disazo compound from Stage Two (12.00 g; 0.0158 mol) was dissolved in water (250 ml) with stirring at pH 9 to which calsolene oil (1 ml) and sodium nitrite (1.20 g; 0.0174 mol) was added. The resulting solution was then added to ice/water (100 g) containing concentrated hydrochloric acid (5 ml) with stirring at 0-10° C. . After stirring for 1 h at 0-10° C. the excess nitrous acid was destroyed by the addition of sulphamic acid. The resulting diazonium salt was added to a stirred solution of 1-(4-sulphophenyl)-3-carboxy-5-pyrazolone (5.39 g; 0.19 mol) in water (100 ml) at 0-10° C. and then adjusted to pH 7. After stirring overnight the solution was poured into acetone (3 l) with stirring, filtered and washed with acetone. The solid dissolved in water and dialysed to low conductivity to give after evaporation (80° C.) a black powder (11.61 g; 68.8%; $\gamma_{max}$ 612 nm and an $\epsilon_{max}$ of 82232; mass spectrum (M-H)-ve 1037).

EXAMPLE 2

Preparation of

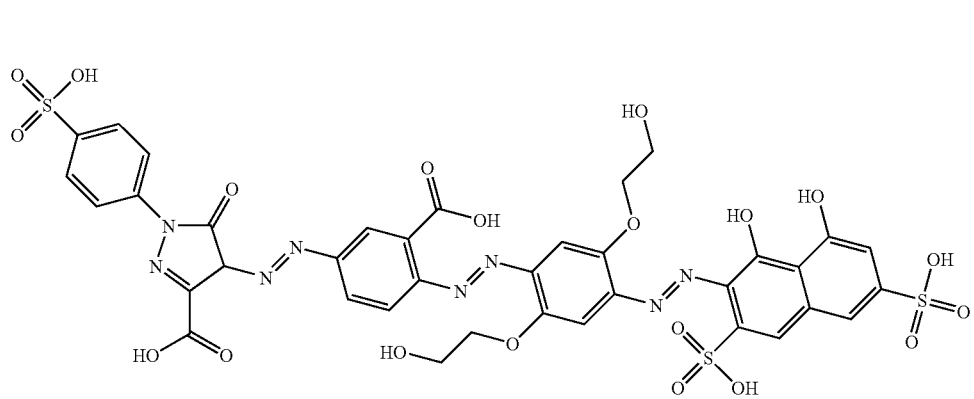

The method of Example 1 was repeated except that in place of 4-amino-3-sulpho acetanilide there was used 4-amino-3-carboxyacetanilide. The resultant compound had a $\gamma_{max}$ at 602 nm and an $\epsilon_{max}$ of 79,227.

EXAMPLE 3

Preparation of

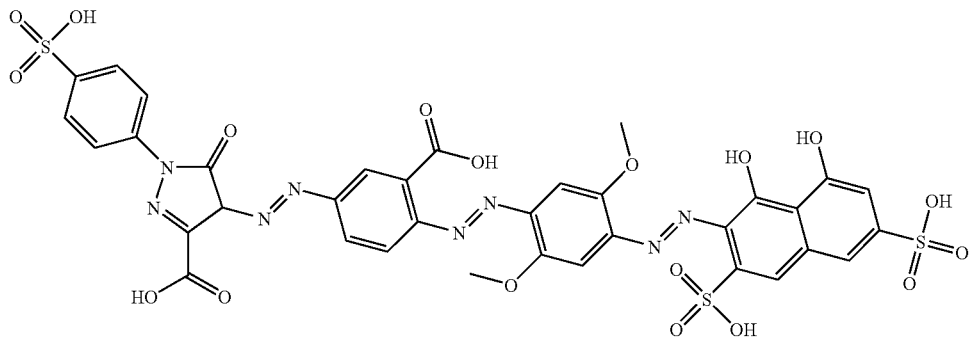

The method of Example 2 was repeated except that in place of 2,5-di-(2-acetoxyethoxy)aniline there was used 2,5-di-(methoxy)aniline. The resultant compound had a $\gamma_{max}$ at 601 nm.

EXAMPLE 4

Preparation of

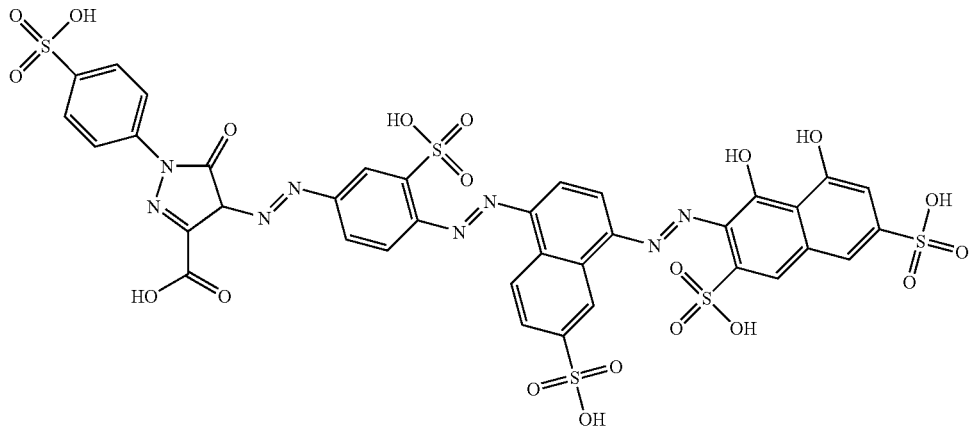

The method of Example 1 was repeated except that in place of 2,5-di-(2-acetoxyethoxy)aniline there was used 1-amino-7-sulphonaphthalene. The resultant compound had a $\gamma_{max}$ at 604 nm and an $\epsilon_{max}$ of 69,419.

EXAMPLES 5 to 38

Examples 5 to 38 shown in Table 1 were prepared by following the general method of Example 1, except that (with reference to Table 1) in place of 1-(4-sulphophenyl)-3-carboxy-5-pyrazolone there was used the compound shown in Column A, in place of 4-Amino-3-sulphoacetanilide there was used the compound shown in Column $L^1$ and in place of 2,5-di-(2-acetoxyethoxy)aniline there was used the compound shown in column $L^2$, unless otherwise indicated ("N/A") in each case. The final dye structure is shown for each example in Table 1.

TABLE 1

| Ex | A | L¹ | L² | Final dye structure | $\epsilon_{max}$ | $\lambda_{max}$ (nm) |
|---|---|---|---|---|---|---|
| 5 | (pyrazolone with phenyl-SO₃H substituent) | N/A | N/A | (final dye structure) | 72925 | 604 |
| 6 | (barbituric acid) | N/A | N/A | (final dye structure) | 73364 | 604 |

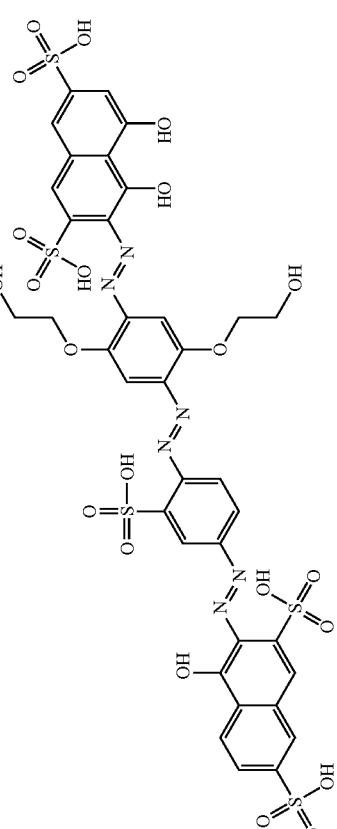

TABLE 1-continued

| Ex | A | L¹ | L² | Final dye structure | $\epsilon_{max}$ | $\lambda_{max}$ (nm) |
|---|---|---|---|---|---|---|
| 9 | (malonanilide structure with H₃C, C=O, NH-phenyl) | N/A | N/A | (azo dye structure with naphthalene-disulfonic acid-diol, bis(hydroxyethoxy)phenyl linker, sulfophenyl, and malonanilide end group) | 61463 | 611 |
| 10 | (3-hydroxy-N,N-diethylaniline structure) | N/A | N/A | (azo dye structure with naphthalene-sulfonic acid-diol, bis(hydroxyethoxy)phenyl linker, sulfophenyl, and 2-hydroxy-4-(diethylamino)phenyl end group) | 82378 | 612 |

TABLE 1-continued

| Ex | A | L¹ | L² | Final dye structure | $\epsilon_{max}$ | $\lambda_{max}$ (nm) |
|----|---|----|----|---------------------|------------------|----------------------|
| 11 | (4-amino-2-aminobenzenesulfonic acid structure) | N/A | N/A | (final dye structure) | 81414 | 609 |
| 12 | (3-(diethylamino)benzenesulfonic acid structure) | N/A | N/A | (final dye structure) | 81685 | 600 |

TABLE 1-continued
| Ex | A | L¹ | L² | Final dye structure | $\epsilon_{max}$ | $\lambda_{max}$ (nm) |
|---|---|---|---|---|---|---|
| 13 | 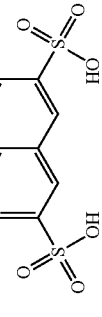 | N/A | N/A | 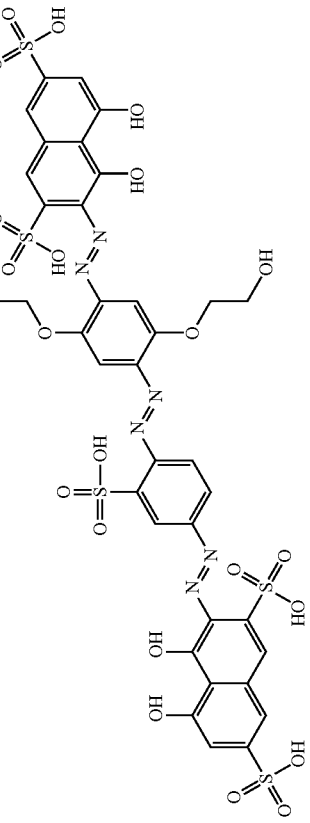 | 99865 | 626 |
| 14 | 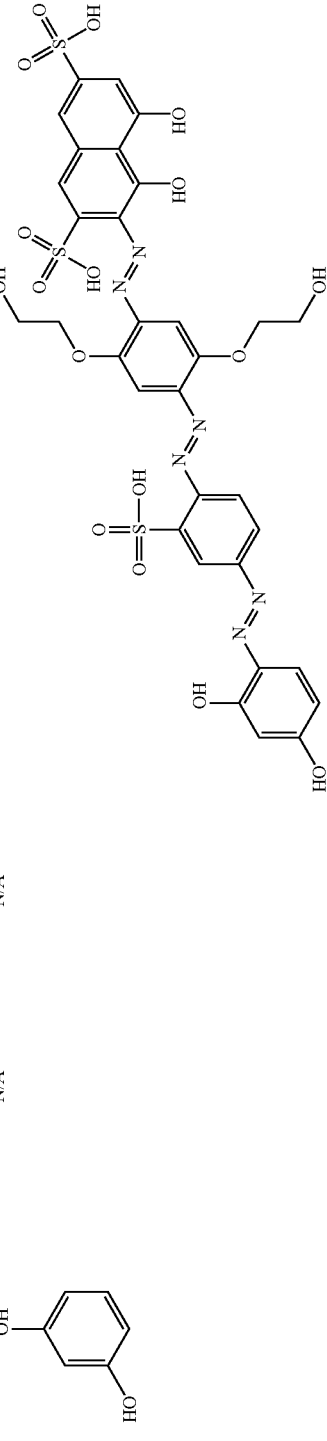 | N/A | N/A | | 85064 | 612 |

TABLE 1-continued

| Ex | A | L¹ | L² | Final dye structure | $\epsilon_{max}$ | $\lambda_{max}$ (nm) |
|---|---|---|---|---|---|---|
| 15 | (pyridone with OH, CH₃, CN, N-ethyl, =O) | N/A | N/A | (trisazo dye structure) | 75,785 | 610 |
| 16 | (pyridone with OH, CH₃, CONH₂, N-ethyl, =O) | N/A | (2-amino-1,4-dimethoxybenzene) | (trisazo dye structure) | | 608 |

TABLE 1-continued

| Ex | A | L¹ | L² | Final dye structure | $\varepsilon_{max}$ $\lambda_{max}$ (nm) |
|---|---|---|---|---|---|
| 17 | [structure] | N/A | [structure] | [structure] | 617 |
| 18 | [structure] | N/A | N/A | [structure] | 609 |
| 19 | [structure] | N/A | N/A | [structure] | 608 |

TABLE 1-continued

| Ex | A | $L^1$ | $L^2$ | Final dye structure | $\epsilon_{max}$ | $\lambda_{max}$ (nm) |
|---|---|---|---|---|---|---|
| 20 | (3-ethoxy-aniline with heptyl chain structure) | N/A | N/A | (azo dye structure) | | |
| 21 | (3-amino-phenoxy octyl structure) | N/A | N/A | (azo dye structure) | | |
| 22 | (pyridone structure with CH₃, OH, C(O)NH₂, N-ethyl) | N/A | (methoxy-methyl-aniline structure) | (azo dye structure) | | 591 |

TABLE 1-continued

| Ex | A | L¹ | L² | Final dye structure | $\epsilon_{max}$ | $\lambda_{max}$ (nm) |
|---|---|---|---|---|---|---|
| 23 | (structure) | (structure) | (structure) | (structure) | | 607 |
| 24 | (structure) | (structure) | N/A | (structure) | | 599 |

TABLE 1-continued

| Ex | A | L¹ | L² | Final dye structure | $\epsilon_{max}$ | $\lambda_{max}$ (nm) |
|----|---|----|----|---------------------|------------------|----------------------|
| 25 | (structure) | (structure) | (structure) | (structure) | | 604 |
| 26 | (structure) | (structure) | N/A | (structure) | | 599 |

TABLE 1-continued

| Ex | A | L¹ | L² | Final dye structure | ε_max | λ_max (nm) |
|----|---|----|----|---------------------|-------|------------|
| 27 | (pyridone structure) | N/A | 8-amino-naphthalene-2-sulfonic acid | (trisazo dye structure) | | 608 |
| 28 | (pyridone structure) | 4-amino-2-acetamido-5-methoxy-benzenesulfonic acid derivative | 2,5-dimethoxy-aniline | (disazo dye structure) | | 607 |
| 29 | (pyridone structure) | 2-amino-5-acetamido-benzoic acid derivative | 2,5-diethoxy-aniline | (disazo dye structure) | | 594 |

TABLE 1-continued

| Ex | A | L¹ | L² | Final dye structure | ε_max | λ_max (nm) |
|----|---|----|----|---------------------|-------|------------|
| 30 | (pyrazolone with phenyl-SO₃H and CH₃ substituents) | 4-acetamido-2-amino-benzoic acid | 2-amino-1,4-dimethoxybenzene | (trisazo dye structure) | | 611 |
| 31 | (N-ethyl-4-methyl-6-hydroxy-3-carbamoyl-pyridinone) | N/A | 2-amino-1,4-dimethoxybenzene | (Cu-complex disazo dye structure) | | 641 |
| 32 | (N-ethyl-4-methyl-6-hydroxy-3-carbamoyl-pyridinone) | N/A | 2-amino-1,4-diethoxybenzene | (disazo dye structure) | | 608 |

| Ex | A | L¹ | L² | Final dye structure | ε_max | λ_max (nm) |
|---|---|---|---|---|---|---|
| 33 | (structure) | N/A | N/A | (structure) | | 601 |
| 34 | (structure) | (structure) | (structure) | (structure) | | 613 |
| 35 | (structure) | N/A | N/A | (structure) | | 607 |

TABLE 1-continued
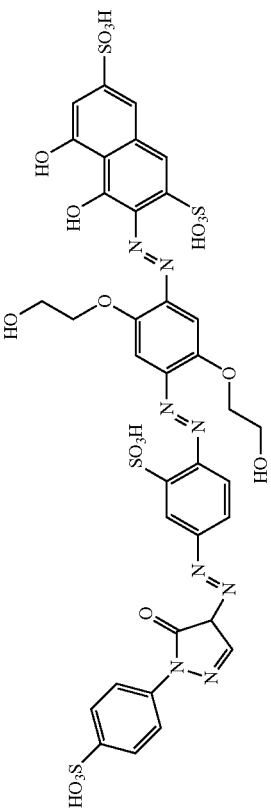

EXAMPLE 39

Preparation of

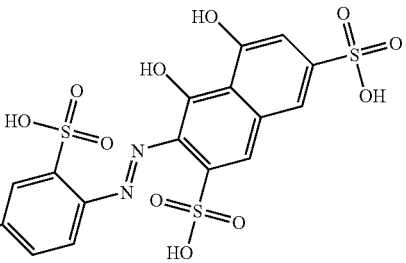

Stage 1

Preparation of the Mono-Azo Intermediate

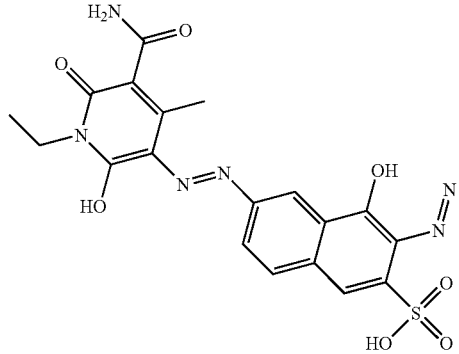

4-Amino-3-sulpho acetanilide diazonium salt (0.2 mol), prepared as in Example 1 (stage 1) above, was added to a stirred solution of chromotropic acid (80.0 g; 0.2 mol) in water (400 ml) at 0-10° C. and pH 6-7 maintained by addition of 2N lithium hydroxide when necessary. After stirring overnight lithium hydroxide hydrate (80 g; 2 mol) was added and the solution was heated at 70-80° C. for 4 hours. The solution was cooled to room temperature, then adjusted to pH 3 by the addition of concentrated hydrochloric acid. The solution was then poured into acetone and then the liquors decanted off. The resulting oil was dissolved in water at pH 8 to give 796.0 g of a 0.1827 molar solution of the above mono-azo intermediate.

Stage 2

Preparation of the Dis-Azo Intermediate

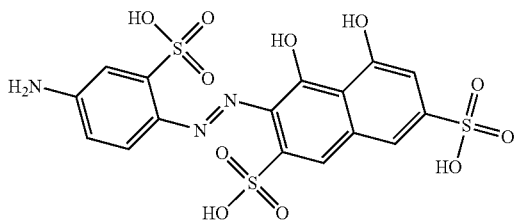

Sodium nitrite (1.52 g; 0.022 mol) was added to the stirred solution from stage 1 (100 ml, 0.02 mol) which was then added dropwise to ice/water (100 ml) containing concentrated hydrochloric acid (6 ml). After stirring for 2 hours the excess nitrous acid was destroyed by the addition of sulphamic acid. The resulting diazonium salt was added to a stirred solution of 1-hydroxy-3-sulpho-7-aminonaphthalene (5.96 g; 0.022 mol) in water (50 ml) at 0-10° C. and pH 8-9 maintained by the addition of 2N lithium hydroxide when necessary. After stirring overnight the product was precipitated by the addition of acetone, filtered and washed with acetone to give after drying a black solid (30.5 g: 0.02 mol).

Stage 3

Preparation of Title Dye

The product from stage 2 (0.01 mol) was dissolved in water (150 ml) at pH 9, sodium nitrite (0.77 g: 0.011 mol) added. The resulting suspension was added to ice/water (100 g) containing concentrated hydrochloric acid (6 ml) at 0-10° C. After stirring for 2 hours the excess nitrous acid was destroyed by the addition of sulphamic acid. The resulting diazonium salt was added to a stirred solution of 1-ethyl-6-hydroxy-4-methyl-2-oxo-1,2-dihydropyridine-3-carboxamide (2.45 g; 0.0125 mol) in water (25 ml) at 0-10° C. and pH 9-10 maintained by the addition of 2N lithium hydroxide when necessary. After stirring overnight the product was precipitated by the addition of acetone then filtered and washed to give after drying a black solid (1.01 g; 10%; $\gamma_{max}$ 598 nm, 631 nm (M-3H)-ve 324).

EXAMPLES 40 to 44

Examples 40 to 44 shown in Table 2 were prepared by following the general method of Example 39, except that (with reference to Table 2) in place of 1-ethyl-6-hydroxy-4-methyl-2-oxo-1,2-dihydropyridine-3-carboxamide there was used the compound shown in Column A, in place of gamma acid there was used the amine shown in Column $L^1$ and in place of 4-amino-3-sulpho acetanilide there was used the amine shown in column $L^2$. The final dye structure is shown for each example in Table 2.

TABLE 2
| Ex | A | $L^1$ | $L^2$ | Final dye structure | $\epsilon_{max}$ | $\lambda_{max}$ (nm) |
|---|---|---|---|---|---|---|
| 40 | 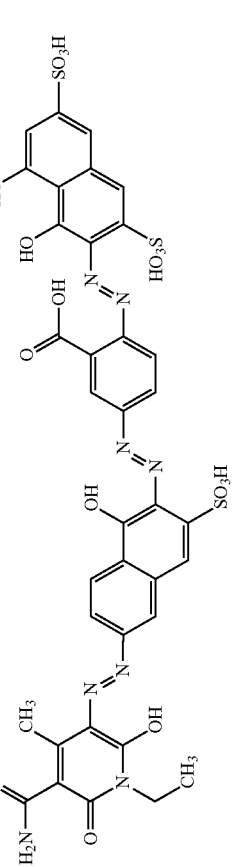 | 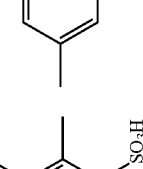 | 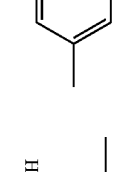 | 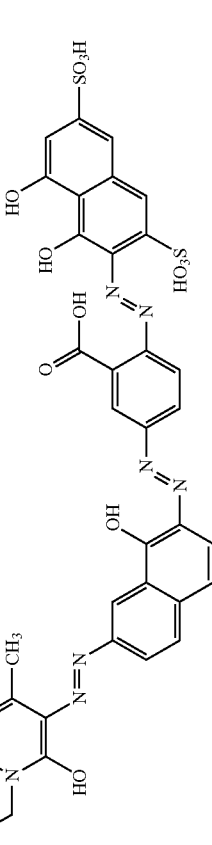 | 83444 | 611 |
| 41 | 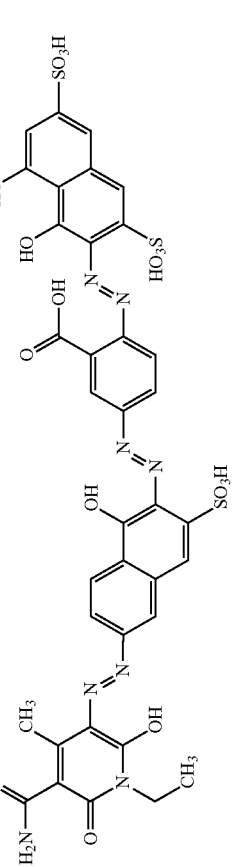 | 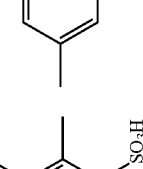 | 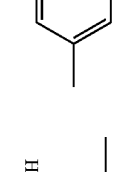 | 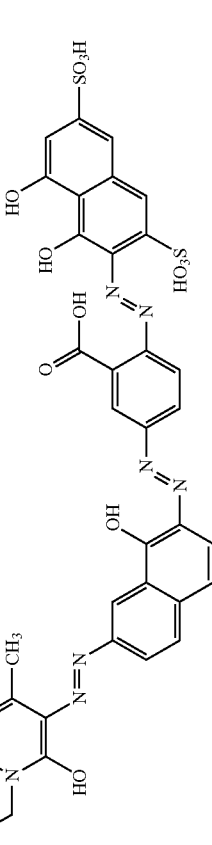 | 77567 | 655 |

TABLE 2-continued

| Ex | A | L¹ | L² | Final dye structure | $\varepsilon_{max}$ | $\lambda_{max}$ (nm) |
|---|---|---|---|---|---|---|
| 42 | | | | | 85240 | 666 |
| 43 | | | | | | 576 |

TABLE 2-continued
| Ex | A | L¹ | L² | Final dye structure | $\varepsilon_{max}$ | $\lambda_{max}$ (nm) |
|---|---|---|---|---|---|---|
| 44 |  |  |  |  | | 582 |

EXAMPLE 45

Preparation of

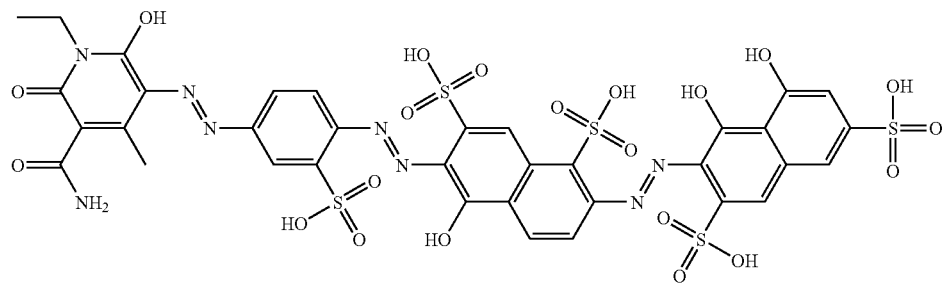

Stage 1

Preparation of the Mono-Azo Intermediate

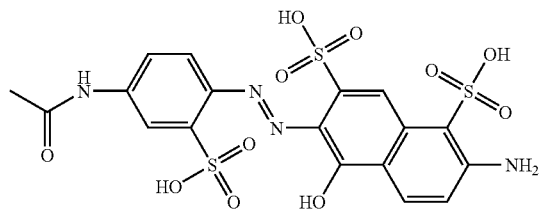

4-Amino-3-sulpho acetanilide diazonium salt (0.1 mol) prepared as Example 1 (stage 1) was added to a stirred solution of 1-hydroxy-6-amino-3,5-naphthalenedisulphonic acid (35.09 g; 0.11 mol) at 0-10° C. and pH 9-10 maintained by the addition of 2N lithium hydroxide when necessary. After stirring overnight the solution was adjusted to pH 8, the product was precipitated by the addition of 30% (w/v) lithium chloride, then filtered and washed with 40% (w/v) lithium chloride solution. The resulting solid was dissolved in water at pH 10 to give 688.7 g of a solution of 0.085 mol of the mono-azo intermediate above.

Stage 2

Preparation of Dis-Azo Intermediate

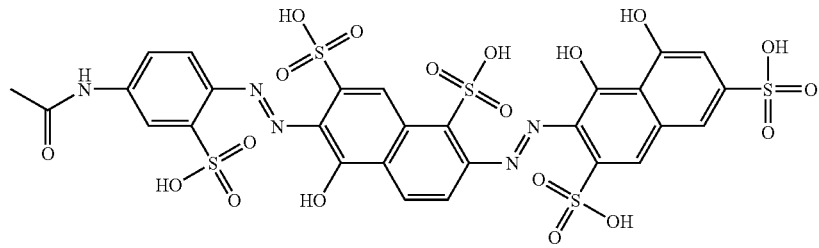

Sodium nitrite (6.3 g; 0.091 mol) was added to the stirred solution from stage 1 (0.084 mol) which was then added to ice/water (200 g) containing concentrated hydrochloric acid (40 ml) at 0-10° C. After stirring for 1.5 hours the excess nitrous acid was destroyed by the addition of sulphamic acid. The resulting diazonium salt was then added to a stirred solution of chromotropic acid (36.96 g; 0.092 mol) at 0-10 ° C. at pH 7-8 maintained by addition of 2N lithium hydroxide when necessary. After stirring overnight the product was precipitated by the addition of 30% (w/v) lithium chloride and then filtered and washed with 35% (w/v) lithium chloride solution. The resulting damp paste was dissolved in water to give 1150 ml of a solution containing 0.084 mol of the dis-azo intermediate above.

Stage 3

Preparation of Hydrolysed Dis-Azo Intermediate

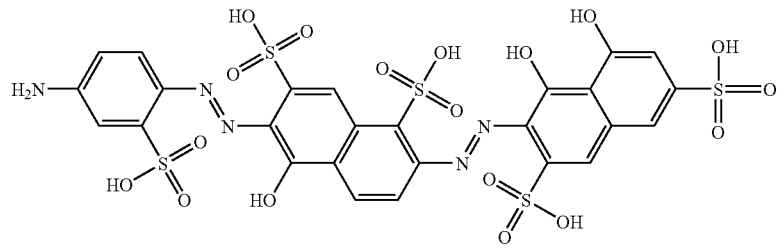

Lithium hydroxide hydrate (50 g; 1.24 mol) was added to 1000 ml of the stirred solution from stage 2 (0.073 mol), which was then heated at 70-80° C. for 2.5 hours. The solution was adjusted to pH 9 with concentrated hydrochloric acid and then cooled overnight to give 1279.0 g of a solution containing 0.072 mol of the dis-azo intermediate above.

Stage 4

Preparation of Title Compound

Sodium nitrite (0.84 g; 0.012 mol) was added to 165 ml of the stirred solution from stage 3 (0.01 mol) which was then added dropwise to ice/water (100 g) containing concentrated hydrochloric acid (6 ml) at 0-10° C. After stirring for 2 hours the excess nitrous acid was destroyed by the addition of sulphamic acid. The resulting diazonium salt was then added dropwise to a stirred solution of 1-ethyl-6-hydroxy-4-methyl-2-oxo-1,2-dihydropyridine-3-carboxamide (2.40 g; 0.012 mol) in water (100 ml) at 0-10° C. and pH 5-7 maintained by the addition of 2N lithium hydroxide solution when necessary. After stirring overnight the product was precipitated by the addition of 15% (w/v) lithium chloride, then filtered and washed with 20% (w/v) lithium chloride solution. The damp paste was dissolved in water (400 ml) and diluted with acetone (4000 ml) with stirring then filtered and washed with acetone. The solid was dissolved in water and then dialysed to low conductivity to give, after evaporation to dryness (60° C.), a black powder (8.15 g; 75%; $\gamma_{max}$ 588 nm, $\epsilon_{max}$ 132812; mass spectrum (M-2H)-ve 527).

EXAMPLES 46 to 59

Mixtures

The following mixtures described in Table 3 may be prepared in which the bracketed number is the number of parts by weight of the relevant compound:

TABLE 3

| Example | Compound (parts) | Compound (parts) |
|---------|------------------|------------------|
| 46 | Example 8 (1) | Example 1 (0.9) |
| 47 | Example 4 (1) | C.I. Direct Yellow 132 (0.1) |
| 48 | Example 8 (1) | Example 13 (0.5) |
| 49 | Example 15 (1) | Example 14 (1) |
| 50 | Example 8 (1) | C.I. Direct Blue 199 (0.15) |
| 51 | Example 1 (1) | Example 8 (1) |
| 52 | Example 8 (1) | Pro-Jet ™ Fast Black 2 (0.7) |

TABLE 3-continued

| Example | Compound (parts) | Compound (parts) |
|---------|------------------|------------------|
| 53 | Example 12 (1) | Example 14 (0.5) |
| 54 | Example 8 (1) | C.I. Direct Yellow 86 (0.12) |
| 55 | Example 3 (1) | Example 8 (0.5) |
| 56 | Example 8 (1) | Pro-jet ™ Yellow OAM (0.05) |
| 57 | Example 1 (1) | Example 4 (1) |
| 58 | Example 4 (1) | Pro-Jet ™ Fast Yellow 2 (0.05) |
| 59 | Example 1 (1) | Pro-Jet ™ Fast Magenta 2 (0.05) |

EXAMPLE 60

Ink Formulations

Inks may be prepared according to the following formulation wherein Dye is the compound or mixture from each of the above Examples above:

| 2-Pyrrolidone | 5 parts |
| Thiodiglycol | 5 parts |
| Surfynol ™ 465 | 1 part (from Air Products Inc., U.S.A.) |
| Dye | 3 parts |
| Water | 86 parts |

Further inks described in Tables 4 and 5 may be prepared wherein the Dye described in the first column is the compound or mixture made in the above Example of the same number. Numbers quoted in the second column onwards refer to the number of parts of the relevant ingredient and all parts are by weight. The inks may be applied to paper by thermal or piezo ink jet printing.

The following abbreviations are used in Table 4 and 5:
PG=propylene glycol
DEG=diethylene glycol
NMP=N-methyl pyrollidone
DMK=dimethylketone
IPA=isopropanol
MEOH=methanol
2P=2-pyrrolidone
MIBK=methylisobutyl ketone
P12=propane-1,2-diol
BDL=butane-2,3-diol
CET=Tris(2-aminoethyl)amine buffer
PHO=$Na_2HPO_4$ and
TBT=tertiary butanol
TDG=thiodiglycol

TABLE 4

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 5.1 | 96 | | | | | | | | | 4 | |
| 13 | 10.8 | 90 | 5 | | | | | | 5 | | | |
| 14 | 10.0 | 80 | 2 | 6 | 2 | 5 | | | 1 | | 4 | |
| 15 | 1.8 | 80 | | 5 | | | | | | | 15 | |
| 16 | 2.6 | 84 | | | 11 | | | | | | 5 | |
| 17 | 3.3 | 80 | 2 | | | 10 | | | | 2 | | 6 |
| 18 | 12.0 | 90 | | | 7 | | 0.3 | | 3 | | | |
| 19 | 5.4 | 69 | 2 | 20 | 2 | 1 | | | | | 3 | 3 |
| 20 | 6.0 | 91 | | | 4 | | | | | | 5 | |

TABLE 5

| Dye | Dye Content | Water | PG | DEG | NMP | CET | TBT | TDG | BDL | PHO | 2P | PI2 |
|---|---|---|---|---|---|---|---|---|---|---|---|---|
| 21 | 3.0 | 80 | 15 | | | 0.2 | | | | | 5 | |
| 22 | 9.0 | 90 | | 5 | | | | | | 1.2 | | 5 |
| 23 | 1.5 | 85 | 5 | 5 | | 0.15 | 5.0 | 0.2 | | | | |
| 24 | 2.5 | 90 | | 6 | 4 | | | | | 0.12 | | |
| 25 | 3.1 | 82 | 4 | 8 | | 0.3 | | | | | | 6 |
| 8 | 0.9 | 85 | | 10 | | | | | 5 | 0.2 | | |
| 8 | 8.0 | 90 | | | 5 | | | 0.3 | | | | |
| 8 | 4.0 | 70 | | 10 | 4 | | | | 1 | | 4 | 11 |
| 8 | 2.2 | 75 | 4 | 10 | 3 | | | | 2 | | 6 | |
| 8 | 10.0 | 91 | | | 6 | | | | | | 3 | |
| 8 | 9.0 | 76 | | 9 | 7 | | 3.0 | | | 0.95 | 5 | |
| 8 | 5.0 | 78 | 5 | 11 | | | | | | | 6 | |
| 8 | 5.4 | 86 | | | 7 | | | | | | 7 | |
| 8 | 2.1 | 70 | 5 | 5 | 5 | 0.1 | 0.2 | 0.1 | 5 | 0.1 | 5 | |
| 8 | 2.0 | 90 | | 10 | | | | | | | | |
| 8 | 2 | 88 | | | | | | 10 | | | | |
| 8 | 5 | 78 | | | 5 | | | 12 | | | 5 | |
| 8 | 8 | 70 | 2 | | 8 | | | 15 | | | 5 | |
| 8 | 10 | 80 | | | | | | 8 | | 12 | | |
| 8 | 10 | 80 | | | 10 | | | | | | | |

EXAMPLES 61-66

Print Test Examples

The inks described in the first paragraph of Example 60 were ink-jet printed onto a variety of papers using a Hewlett Packard DeskJet 560C™. The CIE colour co-ordinates of each print (a, b, L, Chroma and hue H) were measured using a Gretag Spectrolino Spectrodensitometer™ with 0°/45° measuring geometry with a spectral range of 400-700 nm at 20 nm spectral intervals, using illuminant D50 with a 2° (CIE 1931) observer angle and a density operation of status A. No less than 2 measurements were taken diagonally across a solid colour block on the print with a size greater than 10 mm×10 mm. The properties of the resultant prints are shown in Table 6, where the example number of the dye used to prepare the ink is indicated in the left hand column, and ROD is Relative Optical Density. The substrates mentioned in Tables 6, 7 and 8 were as follows:

| | Number |
|---|---|
| HP Printing Paper ™ | 1 |
| HP Premium Plus MkII ™ | 2 |
| Epson Premium Photo ™ | 3 |
| Ilford Instant Dry ™ | 4 |

TABLE 6

| Ex. No. | Dye | Substrate | ROD | L | a | b | C | H |
|---|---|---|---|---|---|---|---|---|
| 61 | 1 | 1 | 1.97 | 11 | −1 | −14 | 14 | 265 |
| 61 | 1 | 2 | 1.20 | 31 | −3 | −12 | 13 | 257 |
| 61 | 1 | 3 | 2.02 | 10 | −1 | −15 | 15 | 264 |
| 61 | 1 | 4 | 2.08 | 9 | 1 | −18 | 18 | 274 |
| 62 | 4 | 1 | 1.73 | 16 | 4 | −18 | 19 | 282 |
| 62 | 4 | 2 | 1.03 | 37 | 0 | −9 | 9 | 269 |
| 62 | 4 | 3 | 1.91 | 12 | 4 | −20 | 21 | 282 |
| 62 | 4 | 4 | 1.71 | 16 | 2 | −16 | 16 | 277 |

TABLE 6-continued

| Ex. No. | Dye | Substrate | ROD | L | a | b | C | H |
|---|---|---|---|---|---|---|---|---|
| 63 | 7 | 1 | 1.93 | 13 | 7 | −31 | 31 | 284 |
| 63 | 7 | 2 | 1.18 | 33 | −1 | −22 | 22 | 268 |
| 63 | 7 | 3 | 1.96 | 13 | 9 | −32 | 33 | 285 |
| 63 | 7 | 4 | 1.98 | 13 | 11 | −36 | 37 | 286 |
| 64 | 16 | 1 | 1.82 | 14 | −2 | −11 | 11 | 259 |
| 64 | 16 | 2 | 1.17 | 32 | −2 | −11 | 11 | 259 |
| 64 | 16 | 3 | 2.07 | 9 | −2 | −13 | 13 | 261 |
| 64 | 16 | 4 | 2.01 | 10 | −1 | −15 | 15 | 266 |
| 65 | 22 | 1 | 1.95 | 10 | 1 | −8 | 8 | 275 |
| 65 | 22 | 2 | 1.19 | 31 | 1 | −9 | 9 | 275 |
| 65 | 22 | 3 | 2.16 | 7 | 2 | −10 | 10 | 281 |
| 65 | 22 | 4 | 2.20 | 6 | 4 | −12 | 12 | 288 |
| 66 | 23 | 1 | 1.92 | 11 | 8 | −15 | 17 | 298 |
| 66 | 23 | 2 | 1.22 | 30 | 3 | −14 | 14 | 281 |
| 66 | 23 | 3 | 2.15 | 6 | 10 | −14 | 17 | 306 |
| 66 | 23 | 4 | 2.15 | 7 | 13 | −20 | 24 | 304 |

Light Fastness

To evaluate light fastness the prints were irradiated in an Atlas Ci5000 Weatherometer™ for 100 hours. The results are shown in Table 7 where the example number of the dye used to prepare the ink is indicated in the left hand column. The degree of fade is expressed as ΔE where a lower figure indicates higher light fastness, and ΔE is defined as the overall change in the CIE colour co-ordinates L, a, b of the print and is expressed by the equation $$\Delta E = (\Delta L^2 + \Delta a^2 + \Delta b^2)^{0.5}.$$

TABLE 7

| Example number | Dye number | SUBSTRATE | ΔE |
|---|---|---|---|
| 61 | 1 | 1 | 12 |
| 61 | 1 | 2 | 9 |
| 61 | 1 | 3 | 3 |
| 61 | 1 | 4 | 9 |
| 62 | 4 | 1 | 8 |
| 62 | 4 | 2 | 14 |
| 62 | 4 | 3 | 5 |
| 62 | 4 | 4 | 22 |
| 63 | 7 | 1 | 12 |
| 63 | 7 | 2 | 13 |
| 63 | 7 | 3 | 5 |
| 63 | 7 | 4 | 10 |
| 64 | 16 | 1 | 16 |
| 64 | 16 | 2 | 9 |
| 64 | 16 | 3 | 9 |
| 64 | 16 | 4 | 22 |
| 65 | 22 | 1 | 14 |
| 65 | 22 | 2 | 11 |
| 65 | 22 | 3 | 6 |
| 65 | 22 | 4 | 9 |
| 66 | 23 | 1 | 7 |
| 66 | 23 | 2 | 10 |
| 66 | 23 | 3 | 9 |
| 66 | 23 | 4 | 4 |

Ozone Fastness

The inks from Examples 61 to 66 were printed onto the substrate shown using a HP$_{560}$™ ink jet printer. The printed substrate was then assessed for ozone stability using an ozone test cabinet from Hampden Test Equipment. The test was carried out for 24 hours at 40° C. and 50% relative humidity in the presence of 1 part per million of ozone. Fastness of the printed ink to ozone was judged by the difference in the optical density before and after exposed to ozone using a Gretag Spectrolino Spectrodensitometer. Thus, the lower the % OD loss the greater the ozone fastness. The results are shown in Table 8 where the example number of the dye used to prepare the ink is indicated in the left hand column. These clearly demonstrate that inks based on compositions of this invention display good ozone fastness.

TABLE 8

| Example number | Dye number | SUBSTRATE | % ROD loss |
|---|---|---|---|
| 61 | 1 | 3 | 15 |
| 61 | 1 | 4 | 19 |
| 62 | 4 | 3 | 12 |
| 62 | 4 | 4 | 16 |
| 63 | 7 | 3 | 20 |
| 63 | 7 | 4 | 23 |
| 64 | 16 | 3 | 24 |
| 64 | 16 | 4 | 31 |
| 65 | 22 | 3 | 10 |
| 65 | 22 | 4 | 7 |
| 66 | 23 | 3 | 4 |
| 66 | 23 | 4 | −1 |

The invention claimed is:

1. A process for printing an image on a substrate comprising applying thereto by means of an ink-jet printer a composition comprising a liquid medium and a tris-azo compound of Formula (1) or salt thereof:

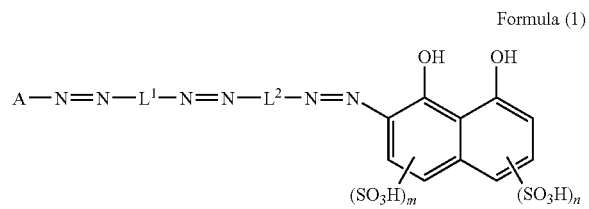

Formula (1)

wherein:
  A is an alkenyl, homocyclic or heterocyclic group;
  L$^1$ and L$^2$ are each independently aryl or heteroaryl; and
  m and n are each independently 0 or 1 such that m+n is 1 or 2;
wherein:
  (i) the compound of Formula (1) is not in the form of a metal chelate; and
  (ii) at least one of L$^1$ and L$^2$ carries at least one substituent selected from sulpho, carboxy, C$_{1-4}$-alkoxy and C$_{1-4}$-alkoxy-OH.

2. A process according to claim 1 wherein the image is text, a picture, a photorealistic image or a combination thereof.

3. A process according to claim 1 wherein the substrate is paper, plastic, metal or glass.

4. A process according to claim 1 wherein:
  A is optionally substituted pyridyl, furyl, thienyl, thiazolyl, isothiazolyl, imidazolyl, benzimidazolyl, pyrazinyl, pyrimidyl, quinolyl, isoquinolyl, benzofuryl, benzothienyl, pyrazolyl, indolyl, purinyl, isoxazolyl, oxazolyl, thiadiazolyl, furazanyl, pyridonyl, pyrazolonyl, pipendinyl, piperazinyl, pyrrolidinyl, morpholinyl, tetrahydrofuranyl, tetrahydrothiophenyl or tetrahydropyranyl;
  L$^1$ phenyl or naphthyl optionally carrying a substituent selected from sulpho and carboxy;
  L$^2$ is phenyl or naphthyl carrying at least one substituent selected from sulpho, carboxy C$_{1-4}$-alkoxy and C$_{1-4}$-alkoxy-OH; and m and n are each independently 0 or 1 such that m+n is 1 or 2;

wherein said optional substituents are selected from OH; $SO_3H$; CN; carbonamido; $PO_3H_2$; $CO_2H$; $NO_2$; $NH_2$; unsubstituted $C_{1-4}$-alkyl or substituted $C_{1-4}$-alkyl carrying a sulpho, carboxy, phosphato, $C_{1-4}$-alkoxy, amino or hydroxy group; unsubstituted $C_{1-4}$-alkoxy or substituted $C_{1-4}$-alkoxy carrying a sulpho, carboxy, phosphato, $C_{1-4}$-alkoxy, $C_{1-4}$-alkyl, amino or hydroxy group; phenyl or phenyl carrying from 1 to 3 substituents selected from sulpho, carboxy, phosphato, $C_{1-4}$-alkoxy, amino, hydroxy and N carrying one or two unsubstituted $C_{1-4}$-alkyl groups or substituted $C_{1-4}$-alkyl groups carrying a sulpho, carboxy, phosphato, $C_{1-4}$-alkoxy, amino or hydroxy group; N carrying one or two unsubstituted $C_{1-4}$-alkyl groups or substituted $C_{1-4}$-alkyl groups carrying a sulpho, carboxy, phosphato, $C_{1-4}$-alkoxy, amino or hydroxy group; and $C_{1-4}$-acylamino.

5. A tris-azo compound of Formula (1) or salt thereof:

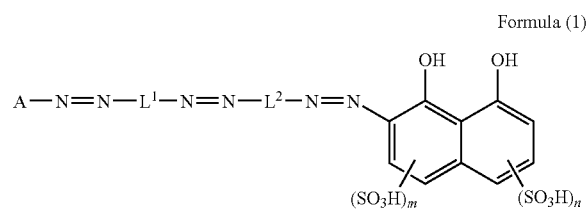

Formula (1)

wherein:

A is an optionally substituted pyridonyl group;

m and n are each independently 0 or 1 such that m+n is 1 or 2; and with the provisos that:

(i) the compound of Formula (1) is not in the form of a metal chelate;

(ii) $L^1$ and $L^2$ are each independently optionally substituted phenylene or naphthylene;

(iii) the optional substituents present on $L^1$ and $L^2$ are selected from OH, $SO_3H$, CN, carbonamido, $PO_3H_2$, $CO_2H$, $NO_2$, $NH_2$, alkyl, alkoxy, aryl, amine and acylamine;

(iv) at least one of $L^1$ and $L^2$ carries at least one substituent selected from sulpho, carboxy, $C_{1-4}$-alkoxy and $C_{1-4}$-alkoxy-OH;

(v) when $L^1$ carries a methoxy group A is not 1,3-diaminophenyl; and (vi) $L^1$ and $L^2$ each independently carries 0 to 3 substituents such that at least one of $L^1$ and $L^2$ carries at least one substituent selected from the group consisting of sulpho and carboxy.

6. A compound according to claim 5 wherein $L^1$ is unsubstituted phenyl or naphthyl or phenyl or naphthyl carrying a substituent selected from sulpho and carboxy.

7. A compound according to claim 5 wherein $L^2$ is phenyl or naphthyl carrying at least one substituent selected from sulpho, carboxy, $C_{1-4}$-alkoxy and $C_{1-4}$-alkoxy-OH.

8. A compound according to claim 5 wherein $L^2$ is phenyl carrying two $C_{1-4}$-alkoxy-OH substituents.

9. A compound according to claim 5 wherein:

A is optionally substituted;

$L^1$ unsubstituted phenyl or naphthyl or phenyl or naphthyl carrying a substituent selected from sulpho and carboxy;

$L^2$ is phenyl or naphthyl carrying at least one substituent selected from sulpho, carboxy $C_{1-4}$-alkoxy and $C_{1-4}$-alkoxy-OH; and m and n are each independently 0 or 1 such that m+n is 1 or 2;

wherein said optional substituents are selected from OH; $SO_3H$; CN; carbonamido; $PO_3H_2$; $CO_2H$; $NO_2$; $NH_2$; unsubstituted $C_{1-4}$-alkyl or $C_{1-4}$-alkyl carrying a sulpho, carboxy, phosphato, $C_{1-4}$-alkoxy, amino or hydroxy group; unsubstituted $C_{1-4}$-alkoxy or $C_{1-4}$-alkoxy carrying a sulpho, carboxy, phosphato, $C_{1-4}$-alkoxy, $C_{1-4}$-alkyl, amino or hydroxy group; phenyl or phenyl carrying from 1 to 3 substituents selected from sulpho, carboxy, phosphato, $C_{1-4}$-alkoxy, amino, hydroxy and N carrying one or two unsubstituted $C_{1-4}$-alkyl groups or $C_{1-4}$-alkyl groups carrying a sulpho, carboxy, phosphato, $C_{1-4}$-alkoxy, amino or hydroxy group; N carrying one or two unsubstituted $C_{1-4}$-alkyl groups or substituted $C_{1-4}$-alkyl groups carrying a sulpho, carboxy, phosphato, $C_{1-4}$-alkoxy, amino or hydroxy group; and $C_{1-4}$-acylamino.

10. A tris-azo compound of Formula (1), as shown in claim 5, or a salt thereof wherein:

A is pyridonyl carrying at least one substituent selected from carbonamido and $C_{1-4}$-alkyl;

$L^1$ is phenyl carrying at least one sulpho substituent;

$L^2$ is phenyl carrying at least one substituent selected from sulpho, carboxy $C_{1-4}$-alkoxy and $C_{1-4}$-alkoxy-OH; and m and n are both 1.

11. A composition comprising a compound of Formula (1) or salt thereof as defined in claim 1 and a low melting point solid or a liquid medium comprising water and an organic solvent, wherein the compound of Formula (1) is not Formula (3) or a salt thereof:

Formula (3)

12. A composition comprising a compound of Formula (1) or a salt thereof and a low melting point solid or a liquid medium comprising water and an organic solvent, wherein the compound of Formula (1) is as defined in claim 6.

13. A composition according to claim 11 or 12 which has a concentration of less than 500 parts per million of halide ions, wherein parts refer to parts by weight relative to the total weight of the composition.

14. A composition according to claim 11 which has less than 50 parts per million of divalent and trivalent metals, wherein parts refer to parts by weight relative to the total weight of the composition.

15. A paper, an overhead projector slide or a textile material printed with a composition according to claim 11.

16. An ink jet printer cartridge, optionally refillable, comprising one or more chambers and a composition, wherein the composition is present in at least one of the chambers and the composition is as defined in claim 11.

17. A paper, an overhead projector slide or a textile material printed with a compound according to claim 5.

18. A paper, an overhead projector slide or a textile material printed by a process according to claim 1.

* * * * *